United States Patent
Knight

(10) Patent No.: US 11,468,211 B2
(45) Date of Patent: Oct. 11, 2022

(54) METHOD OF OPERATING A CAD SYSTEM MODEL FOR MODELLING AN ARTICLE TO BE MANUFACTURED

(71) Applicant: Siemens Industry Software Limited, Farnborough (GB)

(72) Inventor: Peter A. Knight, Cambridge (GB)

(73) Assignee: Siemens Industry Software Limited, Farnborough (GB)

(*) Notice: Subject to any disclaimer, the term of this patent is extended or adjusted under 35 U.S.C. 154(b) by 25 days.

(21) Appl. No.: 16/480,714

(22) PCT Filed: Nov. 30, 2017

(86) PCT No.: PCT/EP2017/081054
§ 371 (c)(1),
(2) Date: Jul. 25, 2019

(87) PCT Pub. No.: WO2019/105562
PCT Pub. Date: Jun. 6, 2019

(65) Prior Publication Data
US 2021/0133365 A1 May 6, 2021

(51) Int. Cl.
*G06F 30/17* (2020.01)
*G06F 30/23* (2020.01)
(Continued)

(52) U.S. Cl.
CPC .............. *G06F 30/17* (2020.01); *G06F 30/23* (2020.01); *G06T 11/203* (2013.01); *G06F 2113/14* (2020.01); *G06F 2113/16* (2020.01)

(58) Field of Classification Search
CPC ...... G06F 2111/04; G06F 30/00; G06F 30/17; G06F 30/23; G06F 2113/14; G06F 2113/16; G06T 11/203
(Continued)

(56) References Cited

U.S. PATENT DOCUMENTS 10,769,321 B2 * 9/2020 Ferri, II ................. G06F 30/17
2005/0240383 A1 10/2005 Hashima et al.
(Continued)

FOREIGN PATENT DOCUMENTS

EP 2120169 A1 11/2009

OTHER PUBLICATIONS

International search report and written opinion dated Aug. 3, 2018 for corresponding PCT/EP2017/081054.

*Primary Examiner* — Cedric Johnson
(74) *Attorney, Agent, or Firm* — Wolter Van Dyke Davis, PLLC

(57) ABSTRACT

A method of operating a computer aided design (CAD) system model for modelling an article to be manufactured includes receiving a representation of the article, receiving constraints for the article, determining a maximum permissible curvature of one or more parts of the article, measuring the maximum curvature of the one or more parts of the article in the received representation and comparing the measured maximum curvature with the maximum permissible curvature. If the measured maximum curvature of at least one of the one or more parts exceeds the determined maximum permissible curvature, an error indication is provided. If the measured maximum curvature of each of the one or more parts does not exceed the determined maximum permissible curvature, the received representation for the article is stored.

17 Claims, 10 Drawing Sheets

(51) Int. Cl.
　　　*G06T 11/20* 　　　(2006.01)
　　　*G06F 113/14* 　　(2020.01)
　　　*G06F 113/16* 　　(2020.01)
(58) Field of Classification Search
　　　USPC .......................................................... 703/1
　　　See application file for complete search history.

(56) References Cited

U.S. PATENT DOCUMENTS

| | | | |
|---|---|---|---|
| 2007/0293962 A1* | 12/2007 | Kimura | G05B 19/4103 700/97 |
| 2010/0106465 A1* | 4/2010 | Sporbert | A61C 7/00 703/1 |
| 2014/0200864 A1 | 7/2014 | Bauschke et al. | |
| 2015/0112474 A1* | 4/2015 | Mizuno | G05B 19/182 700/187 |

* cited by examiner

US 11,468,211 B2

METHOD OF OPERATING A CAD SYSTEM MODEL FOR MODELLING AN ARTICLE TO BE MANUFACTURED

CROSS REFERENCE TO RELATED APPLICATIONS

This application is the US National Stage of International Application No. PCT/EP2017/081054 filed Nov. 30, 2017, and claims the benefit thereof. The International Application is incorporated by reference herein in its entirety.

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for operating a computer aided design (CAD) system model in a modelling system.

A method of operating a computer aided design (CAD) system model, for modelling an article to be manufactured, the method performed on a data processing system may comprise receiving a representation of the article in 2-dimensions, or in 3-dimensions; receiving one or more constraints for the article associated with a parameter of the article; determining a maximum permissible curvature of one or more parts of the article from the constraints of the article; measuring the maximum curvature of the one or more parts of the article in the received representation; comparing the measured maximum curvature with the maximum permissible curvature determined from the constraints of the article; and, if the measured maximum curvature of at least one of the one or more parts exceeds the determined maximum permissible curvature, providing an error indication; or, if the measured maximum curvature of each of the one or more parts does not exceed the determined maximum permissible curvature, storing the received representation for the article.

A data processing system may include a processor; and an accessible memory, the data processing system particularly configured to carry out the steps of receiving a representation of the article in 2-dimensions, or in 3-dimensions; receiving one or more constraints for the article associated with a parameter of the article; determining a maximum permissible curvature of one or more parts of the article from the constraints of the article; measuring the maximum curvature of the one or more parts of the article in the received representation; comparing the measured maximum curvature with the maximum permissible curvature determined from the constraints of the article; and, if the measured maximum curvature of at least one of the one or more parts exceeds the determined maximum permissible curvature, providing an error indication; or, if the measured maximum curvature of each of the one or more parts does not exceed the determined maximum permissible curvature, storing the received representation for the article.

A non-transitory computer-readable medium encoded with executable instructions that, when executed, cause one or more data processing systems to perform a method of receiving a representation of the article in 2-dimensions, or in 3-dimensions; receiving one or more constraints for the article associated with a parameter of the article; determining a maximum permissible curvature of one or more parts of the article from the constraints of the article; measuring the maximum curvature of the one or more parts of the article in the received representation; comparing the measured maximum curvature with the maximum permissible curvature determined from the constraints of the article; and, if the measured maximum curvature of at least one of the one or more parts exceeds the determined maximum permissible curvature, providing an error indication; or, if the measured maximum curvature of each of the one or more parts does not exceed the determined maximum permissible curvature, storing the received representation for the article.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system for modelling an article to be manufactured according to the present disclosure will now be described with reference to the accompanying drawings in which.

DETAILED DESCRIPTION

The embodiments of FIGS. 1 to 10 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

Figure 1:
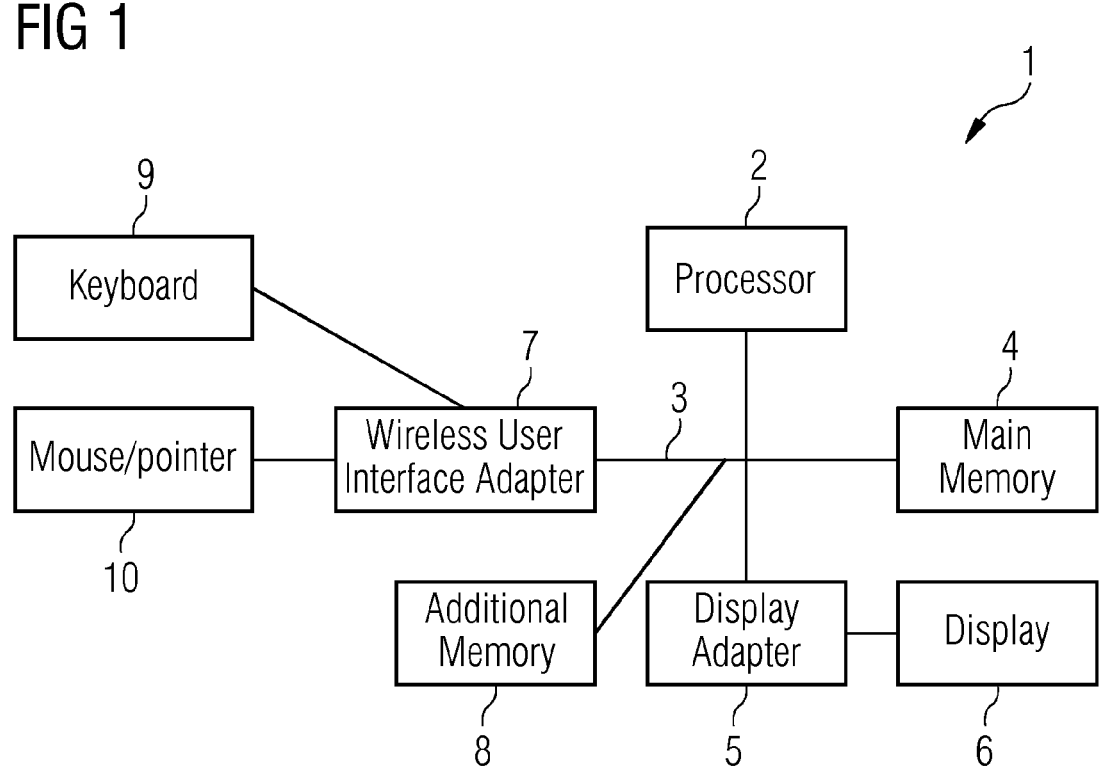
FIG. 1 is a block diagram of a data processing system in which an embodiment can be implemented.

FIG. 1 illustrates an example of a data processing system in which an embodiment of the present disclosure may be implemented, for example a CAD system configured to perform processes as described herein. The data processing system 1 comprises a processor 2 connected to a local system bus 3. The local system bus connects the processor to a main memory 4 and graphics display adaptor 5, which may be connected to a display 6. The data processing system may communicate with other systems via a wireless user interface adapter connected to the local system bus 3, or via a wired network, e.g. to a local area network. Additional memory 8 may also be connected via the local system bus. A suitable adaptor, such as wireless user interface adapter 7, for other peripheral devices, such as a keyboard 9 and mouse 10, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for an object, generate manufacturing instructions for manufacturing that object, or make modifications to the design or manufacturing instructions. The present disclosure relates to a system and method for controlling behaviour in a 2-dimensional or 3-dimensional parametric model. When creating or editing shapes in such models, it is important that the resulting shape meets the end user's requirements both in the model and when actually manufactured in a specified material. When designing a system, or article for manufacture, it is important that the shape as modelled for the design can actually be manufactured. There may be limitations on the system or articles imposed by the material properties of the material that is to be used to manufacture the article. It is desirable to incorporate these constraints into the model, so that when a design is made, or an edit is applied to any element of a shape of the system or article, the model will not result in a characteristic, which either cannot be manufactured in practice, or which, when manufactured, may fail prematurely. An example of this is a system with pipe work, or cabling, where there are limits on the maximum curvature of the pipes or cables that is acceptable, or metalwork, such as rails, spars, or rigging and terminations for these. The method is also useful to provide curvature control, so that a reasonable shape can be achieved with a minimal number of interpolation points. CAD systems often incorporate the ability to fit a spline curve through a set of interpolation points. This can be achieved in many ways, but one of the desirable features is the ability to specify a maximum curvature for the curve.

Although for a designer, limiting maximum curvature helps to give a curve shape which is pleasing to the eye, i.e. one that does not pass through the interpolation points too tightly, limiting maximum curvature is a critical parameter for routing applications, where it is important to ensure that paths modelling wires and pipes do not exceed the maximum curvature allowed by the relevant physical materials from which those wires or pipes are to be manufactured. In a system comprising multiple components, or parts, including components such as wires or pipes which must be fitted around other bulky products in the system, the model of the system needs to take account the practicality of actually manufacturing a wire or pipe, or other length of a product to have the given curvature that the design shows at each position along its length. Changing the location of another product in the system may result in the line of cable run or pipe run being forced into too tight a curve to be successfully manufactured.

In general, constraining the maximum curvature of a curve is a difficult problem, since the point of maximum curvature is not fixed, and the curvature equation is highly non-linear. The disclosure provides a solution to this problem for the case of an interpolating curve represented by a series of cubic Bézier segments.

The method of the present disclosure provides a way of finding the optimal shape for the spline in a way that is relatively fast—the optimized shape is calculated in O(n) time, where n is the number of interpolation points and with a solution which is generally stable to small changes in the interpolation point positions.

Figure 2:
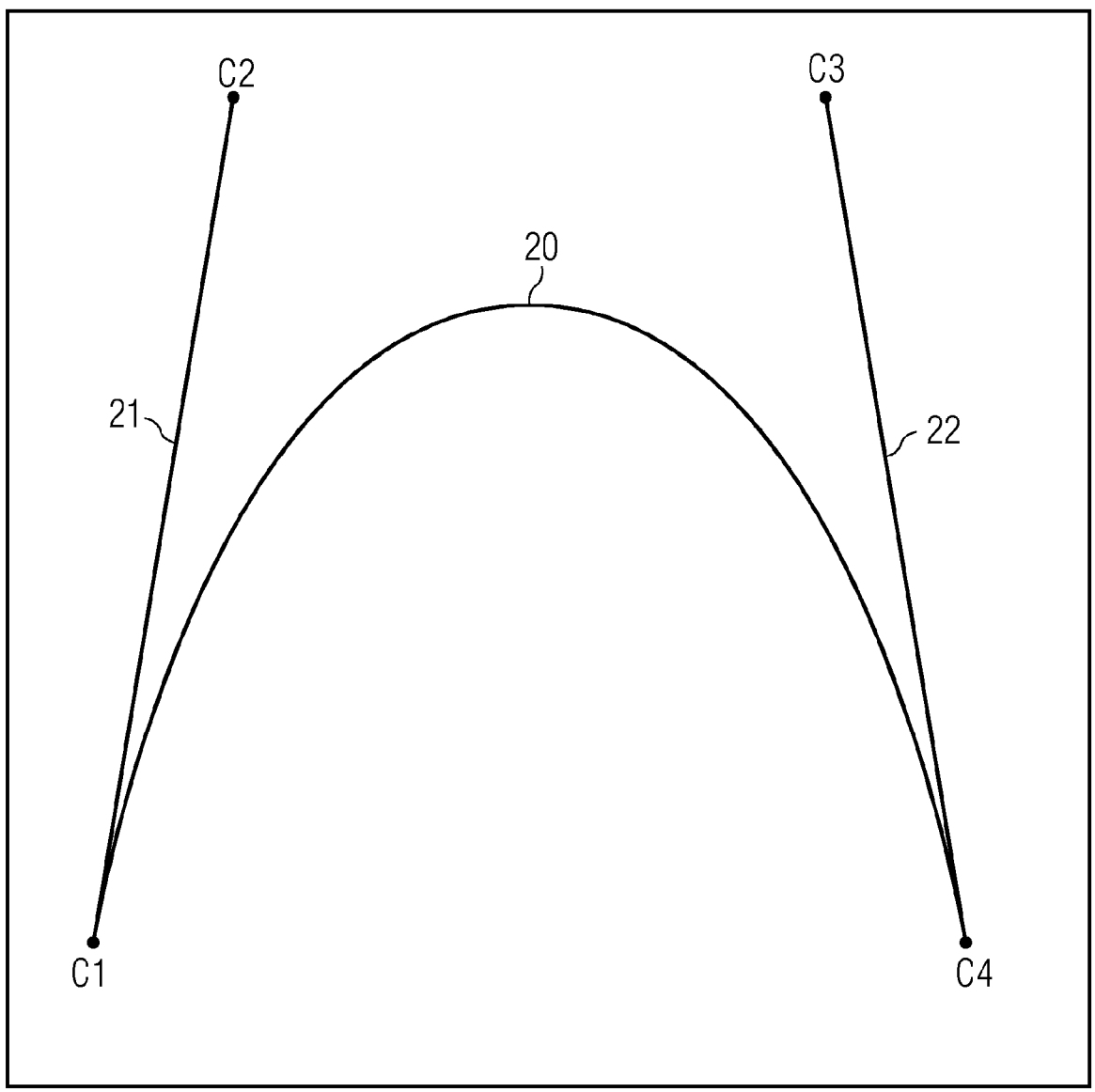
FIG. 2 illustrates a cubic Bézier spline for use in a method according to the present disclosure.

The method is based on a received representation of an article, such as a cable run, or pipe work, or metalwork. Bends in the article designed to fit within a system, or around other products in the system, may be represented as a spline 20, for example a spline comprising cubic Bézier segments, which is a standard form for a spline. The method is used to limit the maximum curvature of the spline. In the example illustrated, each cubic Bézier segment comprises four control points (C1-C4), as shown in FIG. 2. The curve 20 has various key geometric properties, regardless of the positions of the control points. These are that C1 is geometrically coincident to the start of the curve; C4 is geometrically coincident to the end of the curve; the start of the curve is tangent to a line 21 between C1 and C2; and the end of the curve is tangent to a line 22 between C3 and C4. For each part of the article, such as a cable or pipe work, or length of metalwork in which there is curvature, a spline representation is allocated in the model and processed as described hereinafter. For simplicity in the explanation, the description refers to the spline or curves of the model representing a part of an article to be manufactured.

Figure 3:
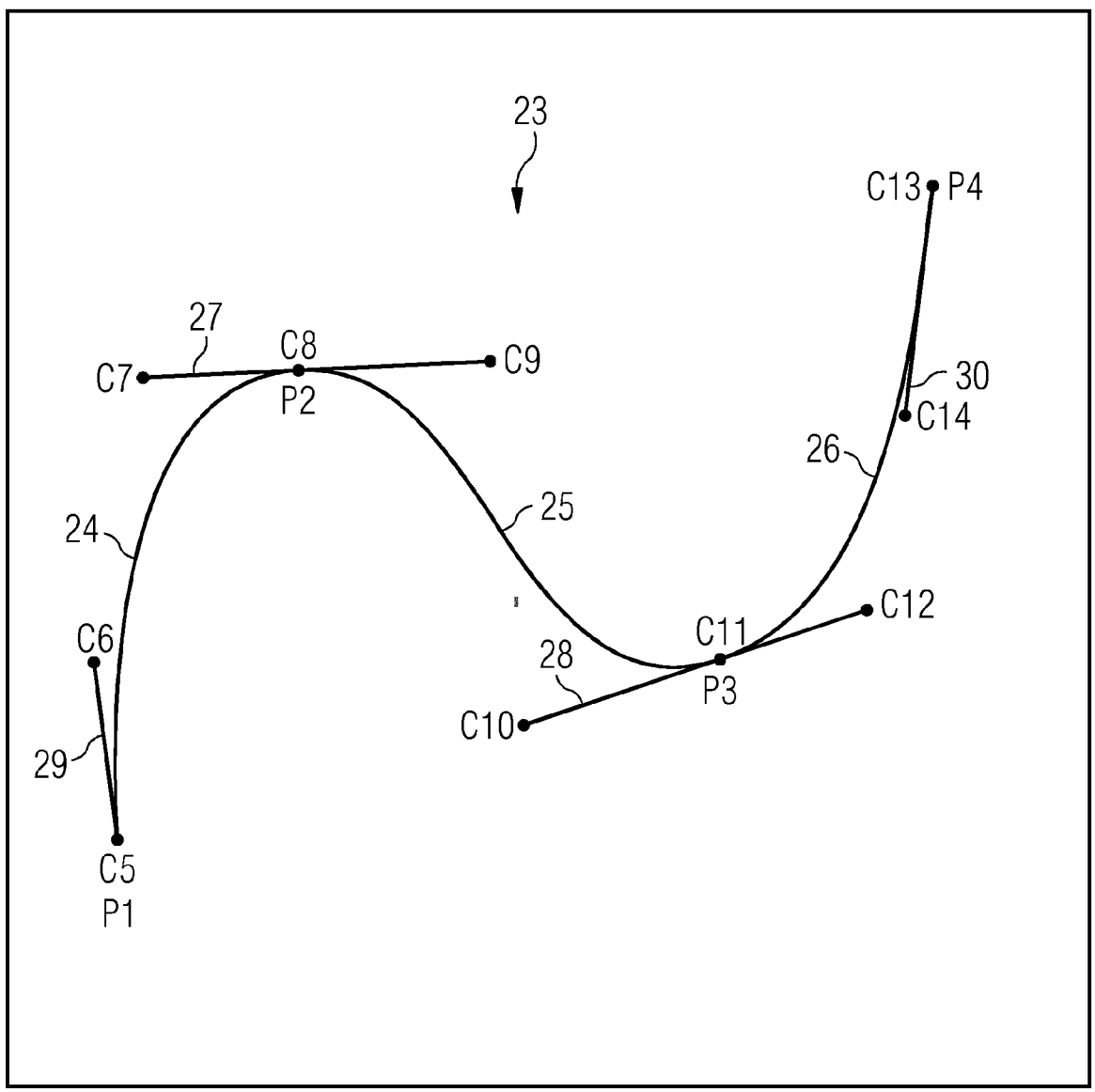
FIG. 3 shows a piecewise cubic Bézier curve to illustrate part of a method according to the present disclosure.

An interpolating spline may be constructed using a series of such cubic Bezier segments 20. An example of such a curve 23, or interpolating spline, interpolating the points P1, P2, P3 and P4 is shown in FIG. 3. In this example, the spline 23 is a piecewise cubic Bézier curve comprising three cubic Bézier segments, or curves 24, 25, 26. The end control points C8, C11 of each segment are shared with the previous and next segments, i.e. the first segment is between C5 and C8, the second between C8 and C11 and the third segment is between C11 and C13. This ensures that the curve 23 is continuous, i.e. with shared end control points, the overall curve will not have any gaps. If the adjoining pairs of control points are collinear, then the overall curve is tangent (G1) at the common control point. In order to ensure that the curve is G1 continuous at the joins between the segments, adjoining pairs of control points must be collinear. Hence, C8 must lie on a line 27 between C7 and C9, and C11 must lie on a line 28 between C10 and C12. In the same way as in FIG. 2, the start of the curve 23 is tangent to a line 29 between C5 and C6; and the end of the curve 23 is tangent to a line 30 between C14 and C13

This example may be generalised to n interpolation points P1 to Pn, for which the curve 23 comprises n−1 Bézier segments 24, 25, 26, with 3(n−1)+1 control points. This example shows the simplest construction for a piecewise Bézier spline, with a single Bézier curve or segment between two interpolation points, but it is also possible to have more than one Bézier curve, or segment, between each pair of interpolation points. This has advantages for minimizing the curvature, since there are more freedoms for the curve. The method described applies equally to those more complex curves. Thus, a cable run with a more complex shape may be represented using multiple Bézier curves between interpolation points. Using more Bézier segments allows a solution with a slightly higher maximum radius of curvature.

Given a set of interpolation points Pi, and the geometric constraints on a piecewise Bézier spline interpolating those points, there are many possible curve shapes that may be generated. The present disclosure provides a method of ensuring that the generated curve does not exceed a given global maximum curvature, k. Typically, this value k is under the control of the user. The value may be provided directly as part of the method, for example, by user input, or extracted from a store, the value having been determined in an earlier step. Alternatively, the value may be calculated as part of the method of the present disclosure, using received inputs relating to the material properties or other parameters which control the behaviour of the material from which the part will be manufactured and so limit the amount of curvature that the part can have.

Figure 7:
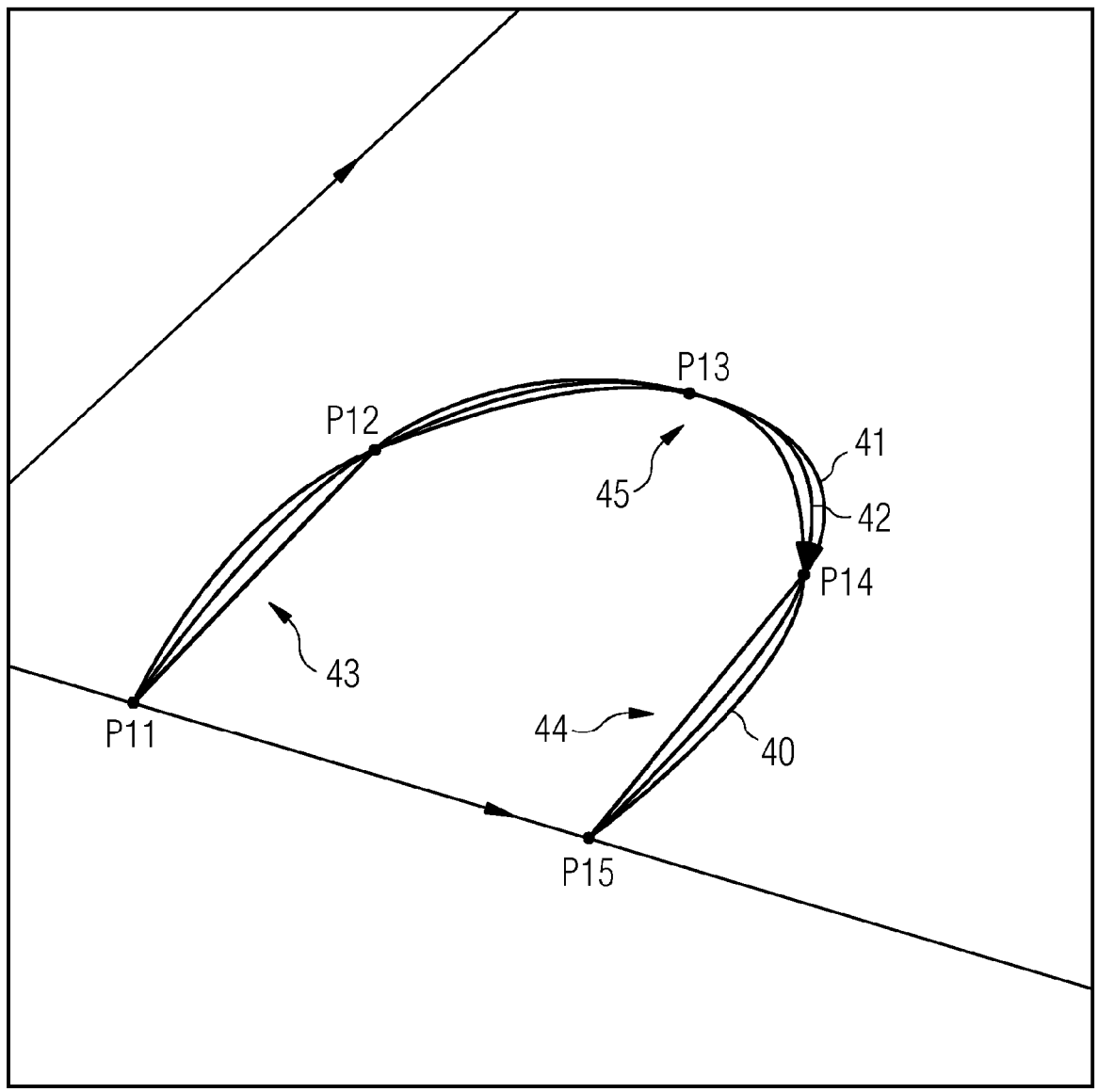
FIG. 7 illustrates initial, optimal and intermediate curves in a method of the present disclosure.
Figure 8:
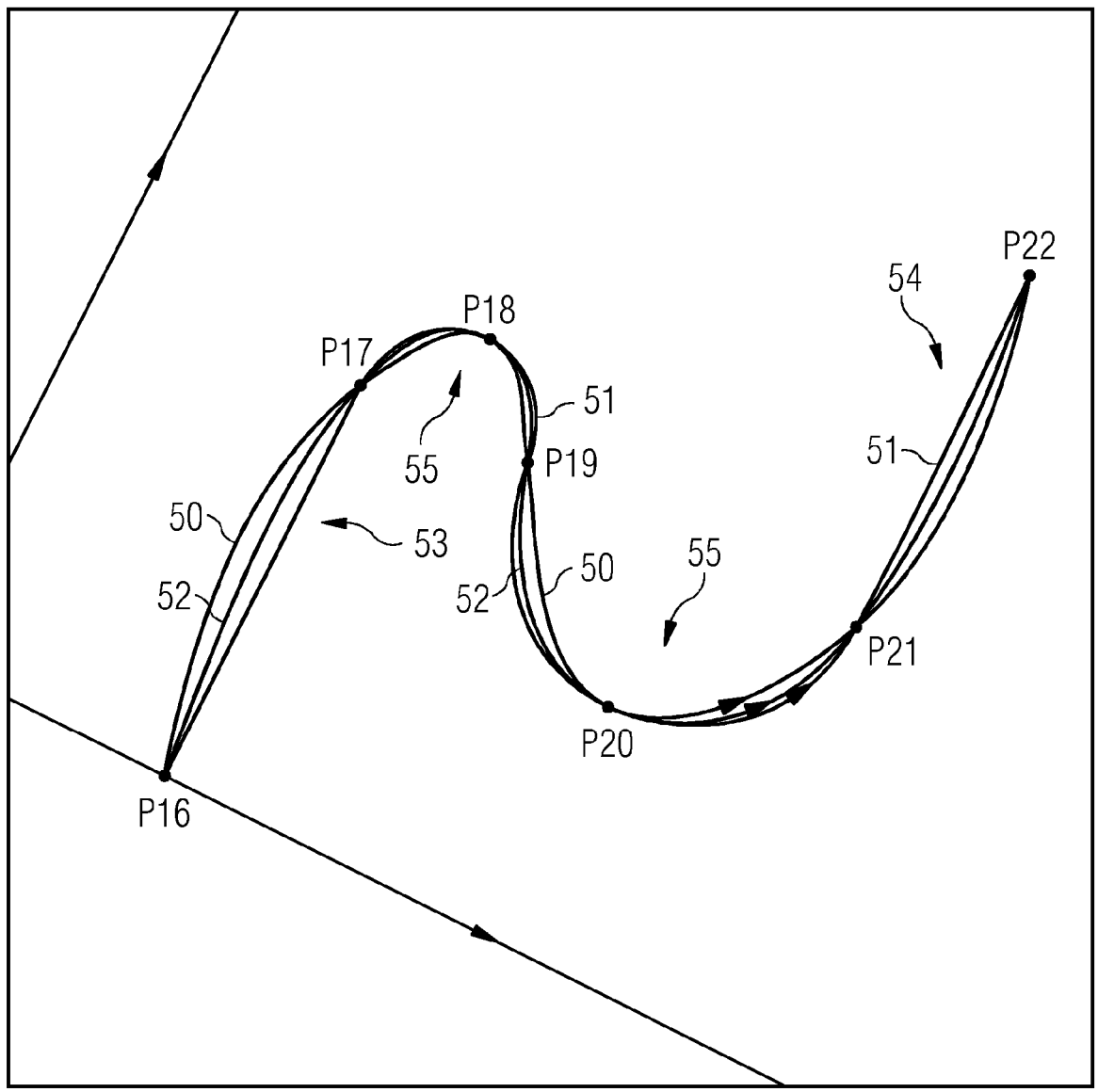
FIG. 8 illustrates an optimal curve in a method of the present disclosure.

Whichever way the maximum curvature has been obtained, the method of the present disclosure stars by receiving a representation of the article in 2-dimensions, or in 3-dimensions. That representation may be described as an initial piecewise cubic Bézier curve, for example curves 40, 50 as shown in FIGS. 7 and 8 and described in more detail below. To ensure that the representation does not exceed the curvature limitation, the maximum curvature of the original curve, or the maximum curvature of each of the segments of the curve, as appropriate, are measured. The measured curvature is then compared with the determined maximum permissible curvature, for given constraints of the article.

If the measured curvature does not exceed the maximum permissible curvature, then the representation of the article as represented by the curve is deemed acceptable and that representation may be stored for use in manufacturing, or used in further processing. If the measured curvature is found to exceed the maximum permissible curvature, then further steps are required to obtain an acceptable amount of curvature. In one case, the next step may be to generate an optimal piecewise cubic Bézier curve through the same interpolation points. This optimal curve is one having the lowest curvature possible with the same number of Bézier intervals as the original curve. This is described in more detail below.

Again, the maximum curvature of the curve, in this case, the optimal curve, is measured. The measured curvature is then compared with the determined maximum permissible curvature, for given constraints of the article. If the measured curvature still exceeds the determined maximum permissible curvature, then the process stops, typically with an error indication, as it is not possible to achieve a better solution than that of the optimal curve. In response a user may need to adjust the interpolation positions slightly, or possibly choose a different material from which to make the article and hence change the constraints. However, if the measured curvature does not exceed the determined maximum permissible curvature, when using an optimal curve, then further steps may be taken to improve upon that optimal, lowest possible curvature, curve.

For example, if there are two curves with the same number of Bézier segments, one of which has a curvature >k, the other having a curvature <k and these curves bound an infinite family of curves, the shapes of which are determined by the control point positions of the initial and optimal curves, as well as a single parameter x (0≤x≤1) which is used to select the desired curve, then it is possible to vary the single parameter, x to try to find a member of the family of curves which has a curvature of k, to some specified tolerance. If this step produces a solution, then this intermediate curve may be used. If no solution is found, then the process may terminate with an error condition, or may return the solution closest to the desired curvature, but without exceeding it.

Another option, for a design made up of several segments, some of which are within the acceptable maximum curvature and some of which are not, is to keep the segments that are acceptable and then try modifications to the ones that are not acceptable to obtain a curvature that is within the limits. The whole curve representing the path of the cables or pipes, as modified, is then saved. This may be done by choosing a section of curve which needs to be adjusted, then fixing the tangent directions at the start and end of that section. This gives a sub-curve to optimise using the method as described. If no solution is found, the region may be expanded repeatedly, until it comprises the whole curve.

The procedure is affinely invariant. Hence, if C(p) is the curve from points pi, and T is a translation, rotation or scaling, then T(C(p))=C(T(p)).

The selection of the optimal curve is a difficult problem. In general, it might be possible to use general n-dimensional minimisation techniques to find the set of control point positions that minimize the global curvature, subject to G1 continuity between the segments. Unfortunately, the maximum curvature is highly non-linear and jumps from place to place along the curve as the control point positions are varied. For small numbers of Bézier segments, it might be possible to search the parameter space exhaustively. Otherwise, we must use methods that find a global minimum that is close in value to the true minimum. Unfortunately, for the problem considered here, such a method leads to unstable spline shapes, changing significantly as the interpolation point positions are varied slightly.

The approach outlined here is to note that, for the case of three points, the lowest curvature path is an arc interpolating the points. Note that, in general, this isn't the case for more than three points. However, many real world interpolation problems are characterised by straight line segments (equivalent to infinite radius circles here) and right-angled bends (quarter circles). In these cases, the lowest curvature path is often a series of lines and arcs. Even for more general cases, such a construction is also close to optimal. We therefore seek an optimal curve which is a Bézier curve approximation to a sequence of arc and straight line segments.

The first step in the calculation of the optimal curve is to fit a series of exact arc segments to the interpolation points, using the following method:
(1) Find the plane, N1, containing the first three interpolation points.
(2) Choose a direction, in plane N1, for the start of the curve (0θ)
(3) Fit an arc through the first and second interpolation points. In general, there is only one possible arc, given the geometric constraints, and this will also lie in plane N1. Now proceed to step 4, setting i=2.
(4) Arc i−1 gives a direction for the curve passing through Pi. Use this, together with Pi and Pi+1, and plane i (containing Pi to Pi+2) to find the position of arc i.
(5) Repeat step 4 for all i<=n, until all of the arc segments have been calculated.

Figure 4:
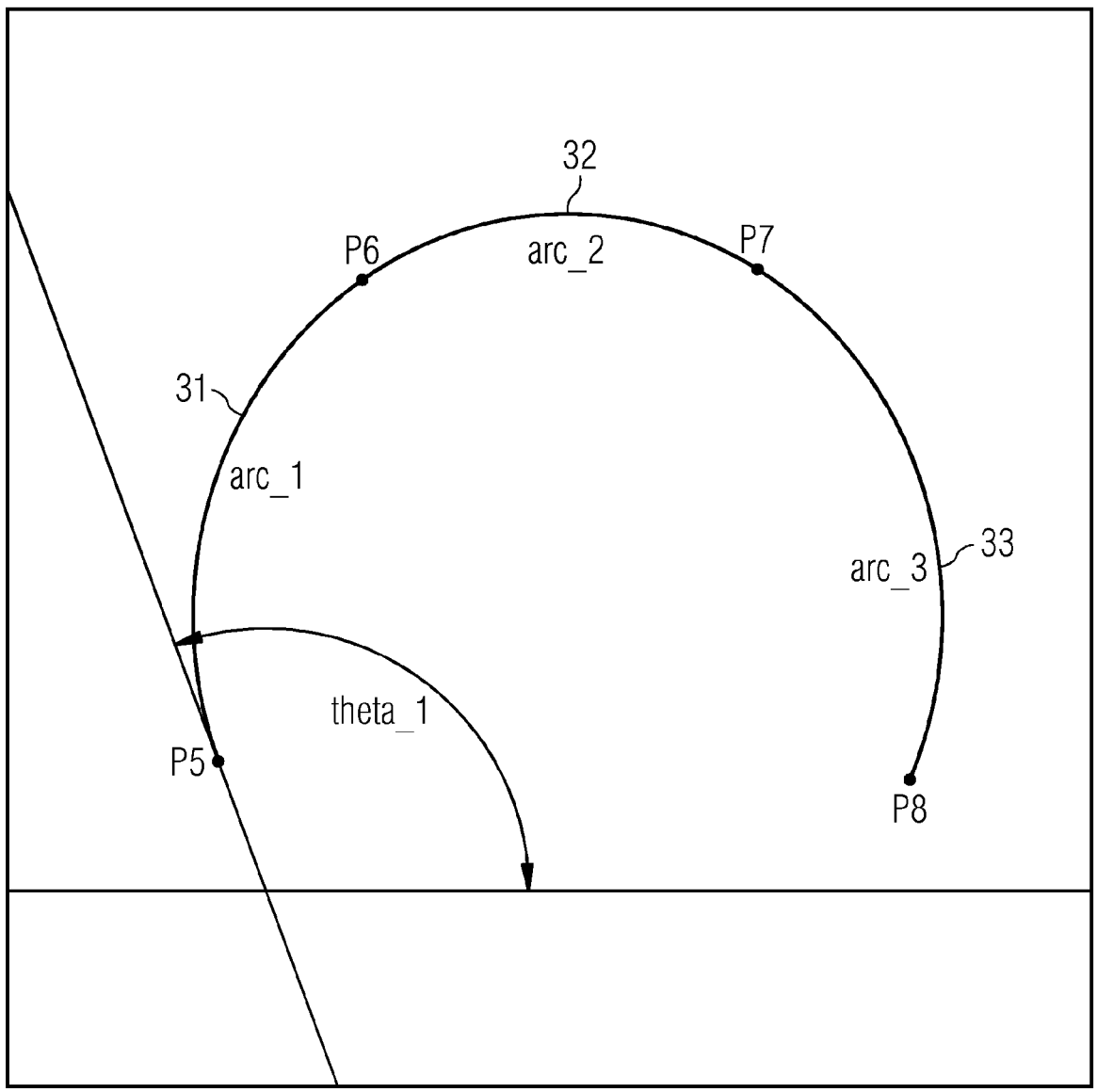
FIG. 4 illustrates fitting arcs to interpolation points in a method according to the present disclosure.

The result of the process, for a case involving four interpolation points, is shown in FIG. 4. A series of three arcs 31, 32, 33 are fitted to four interpolation points P5 to P8. Given an initial curve direction (θ1), the parameters of the arcs are uniquely determined. Due to the choice of θ1, the procedure described in steps 1 to 5 above does not generally give the series of arc segments with lowest curvature through the interpolation points. To achieve the series of arc segments with lowest curvature through the interpolation points, then θ1 is varied, using standard 1D minimization techniques, until the curve with the lowest curvature is found, i.e. the minimum radius of the string of arcs is maximised.

The final step in determining the optimal curve is to convert the series of arcs to a piecewise cubic Bézier representation. The end points of each Bézier segment are known, they are the relevant interpolation points, and the end directions are also known, from the directions of the arcs through the interpolation points. The only freedom for each Bézier segment is therefore the length of C1-C2 and C3-C4 (see FIG. 1). Since the aim is to approximate an arc, the lengths of C1-C and C3-C4 are set to be equal to one another, leaving only a single degree of freedom for each Bézier segment 20.

The single degree of freedom may be constrained in various standard ways. The simple requirement that the mid-point M of the Bézier segment 34 is geometrically coincident to the midpoint of the relevant arc 35 may be adopted. This procedure enables a Bézier curve to approximate circular arcs, i.e. those with internal angles of ≤180°, to within a few percent, for example as shown in FIG. 5.

Figure 5:
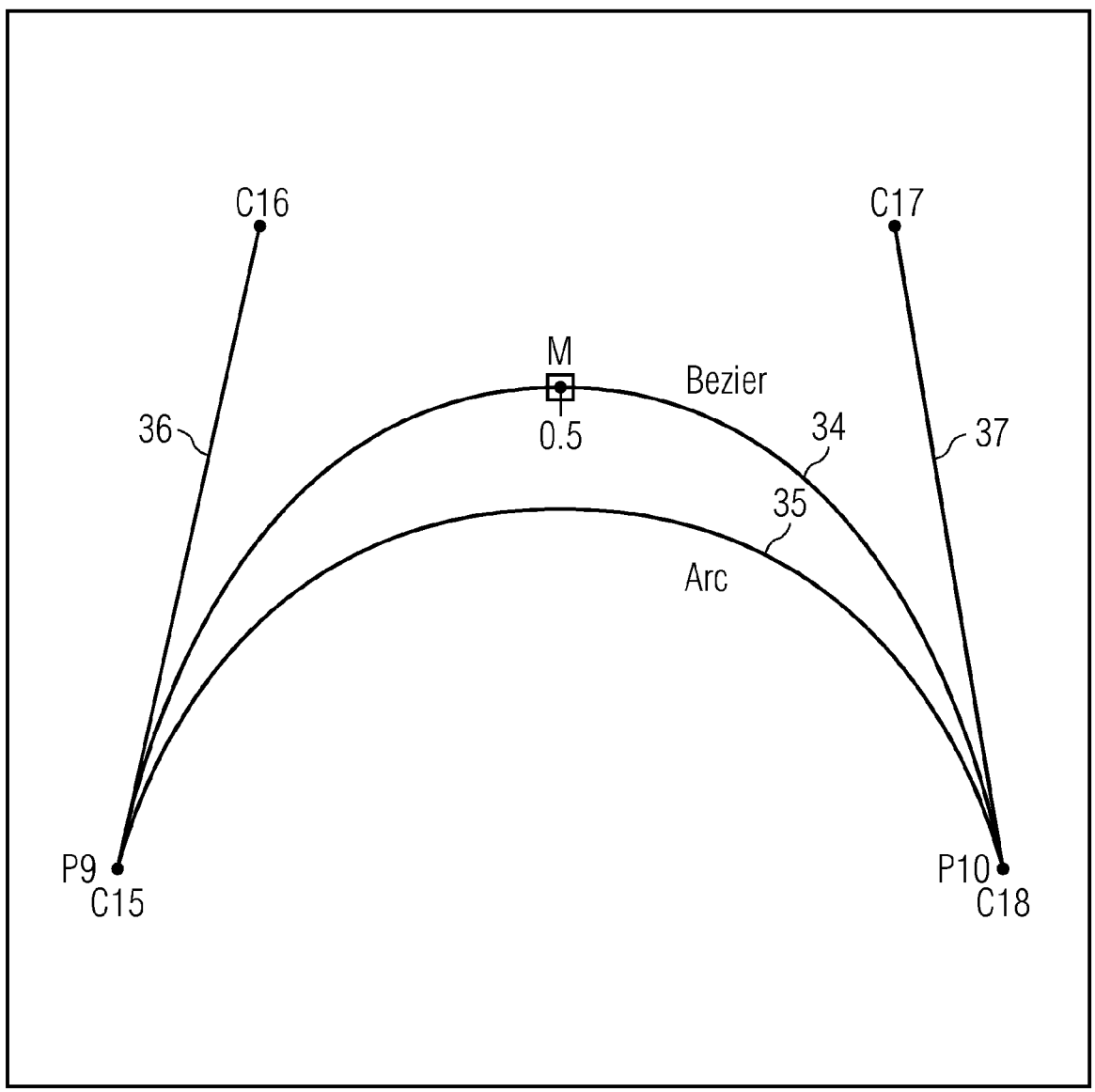
FIG. 5 illustrates fitting a Bézier segment to an arc in a method according to the present disclosure.

FIG. 5 illustrates fitting a Bézier segment 34 to an arc 35. The lengths of line C15-C16 36 and line C17-C18 37 are equal. Making midpoint M coincident to the middle of the arc 35 gives a Bézier curve 34 which is almost indistinguishable from the arc itself. If a curve has more Bézier intervals between each pair of interpolation points P9, P10, coincident with C1 and C4, an even more exact arc representation may be achieved. Similarly, an exact arc representation may be obtained by using rational spline segments between each pair of points.

Given the initial curve and optimal curves, other curves with intermediate curvature may be calculated by interpolating between the control points of each curve. This interpolation is not calculated using the control point positions directly, since this may break the G1 continuity of the curve. Any interpolation method must therefore be careful to maintain this continuity.

Various interpolation methods are possible and an example of an interpolation method that may be used is described below. However, other interpolation methods may also be valid.

Figure 6:
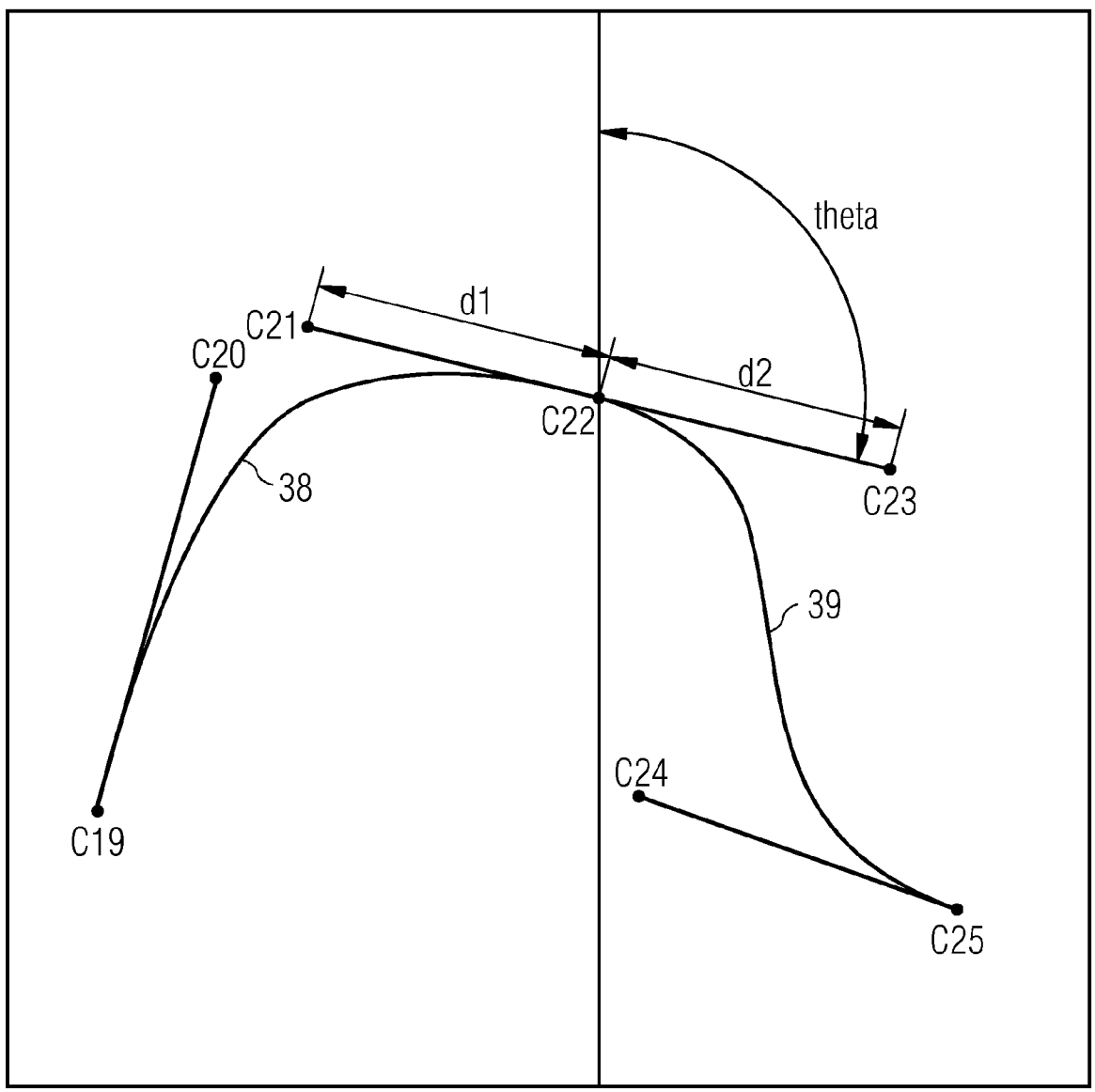
FIG. 6 illustrates definition of control points in a method according to the present disclosure.

Each curve may be described using the positions of the interpolation points ($P_i$), the direction of the curve 38, 39 at each interpolation point ($\theta_i$), and the distance to the previous and next Bézier control points ($d_{1,i}$ and $d_{2,i}$), for example as illustrated in FIG. 6. In order to calculate the parameters of the intermediate curve, a linear interpolation is carried out between the $\theta_i$, $d_{1,i}$ and $d_{2,i}$ of the original and optimal curves, using a single parameter, x:

$$d_{1,i}^{int} = (1-x)d_{1,i}^{orig} + xd_{1,i}^{opt}$$
$$d_{2,i}^{int} = (1-x)d_{2,i}^{orig} + xd_{2,i}^{opt}$$
$$\theta_{1,i}^{int} = (1-x)\theta_{1,i}^{orig} + x\theta_{1,i}^{opt}$$

Where the superscripts orig, opt and int, refer to the quantity from the original, optimal and intermediate curves respectively, for example curves as shown in FIGS. 7 and 8. Once the above interpolated quantities are calculated, the positions of the interior control points (i.e. C20, C21, C23 and C24 in FIG. 6) are easily computed. FIG. 6 provides a definition of C21 and C23 in terms of C22, d1, d2 and θ. The start of the curve is tangent to a line between C19 and C20; and the end of the curve is tangent to a line between C24 and C25. The resulting family of G1 continuous curves 40, 42, 44, for example as shown in FIGS. 7 and 8, varies smoothly between the original and optimal curves. As mentioned previously, x is varied from 0 to 1 in order to find the curve with the specified maximum curvature.

Some examples of the method are shown in FIGS. 7 and 8. In each case, an original Bézier curve 40, 50, the optimal curve 41, 51, and an arbitrary intermediate curve 42, 52 obtained by interpolating between the two previous curves 40, 41, 50, 51 are shown.

In FIG. 7, the initial curve 40, optimal curve 41 and intermediate curve 42 are shown for a case with five interpolation points P11 to P15. The optimal curve 41 comprises straight line segments 43, 44 between P11-P12 and P14-P15, with an arc 45 from P12 to P14. In FIG. 8, the optimal curve 51 is shown for a case with seven interpolation points, P16 to P22. The optimal curve 51 comprises straight line segments 53, 54 between P16-P17 and P21-P22, with two arcs 55 from P17 to P19 and P19 to P21.

The disclosure provides a method of modelling and article to be manufactured which includes parts where curvature is constrained by the material or other properties of the article and which is able to limit the maximum curvature of a piecewise Bézier curve by constructing an optimal curve, which in the examples shown comprises a spline comprising arc segments and applying an interpolation procedure to find an intermediate curve of the desired curvature. The method allows for custom spline functionality and control of maximum curvature of the spline and hence of the product that the spline represents.

Figure 9:
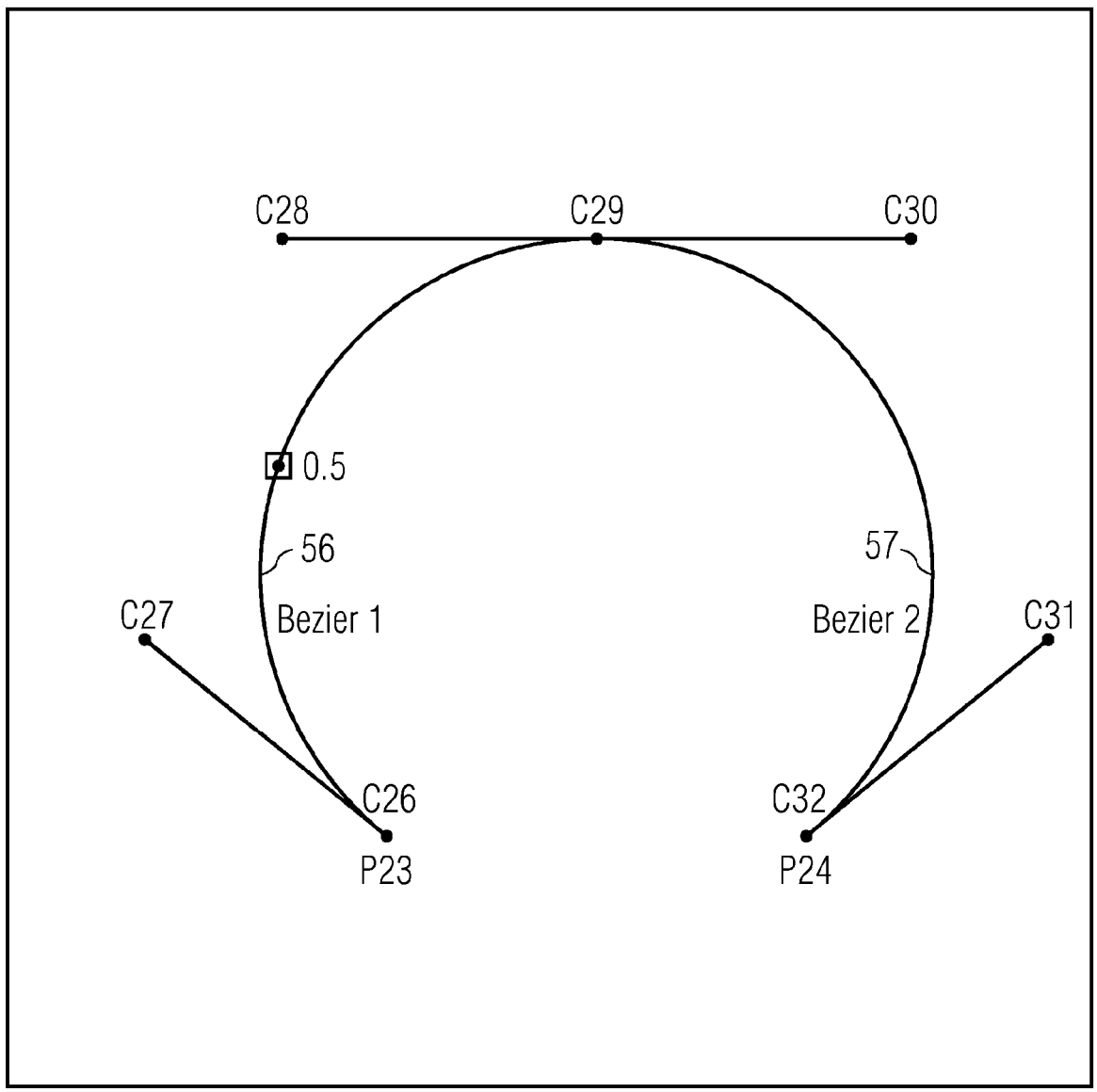
FIG. 9 illustrates an example of the method of the present disclosure in which there is more than one cubic Bézier segment between two interpolation points; and, FIG. 10 is a flow diagram of a method of operating a model for modelling an article to be manufactured in accordance with the disclosed embodiments.

The disclosure is also applicable in the case where more than one curve segment is used between pairs of interpolation points. FIG. 9 illustrates an example of where two cubic Bézier segments C26 to C29 and C29 to C32 are used between a pair of interpolation points P23 and P24. In this case, the large arc shape is much better represented by two Bézier segments 56, 57 than it would be by a single curve. The choice of whether to use a single Bézier curve, or more than one Bézier segment is a trade-off between performance and obtaining the best possible shape. With more curve complexity, the two segment option allows the optimal curve to be approximated more closely. Similarly, a rational spline could be used to represent the arc segments of the optimal curve exactly. The rational spline segment has more freedoms (control point weights) than the Bézier, so it is possible to represent the arcs more exactly. The weights are then interpolated from the initial to optimal splines.

Figure 10:
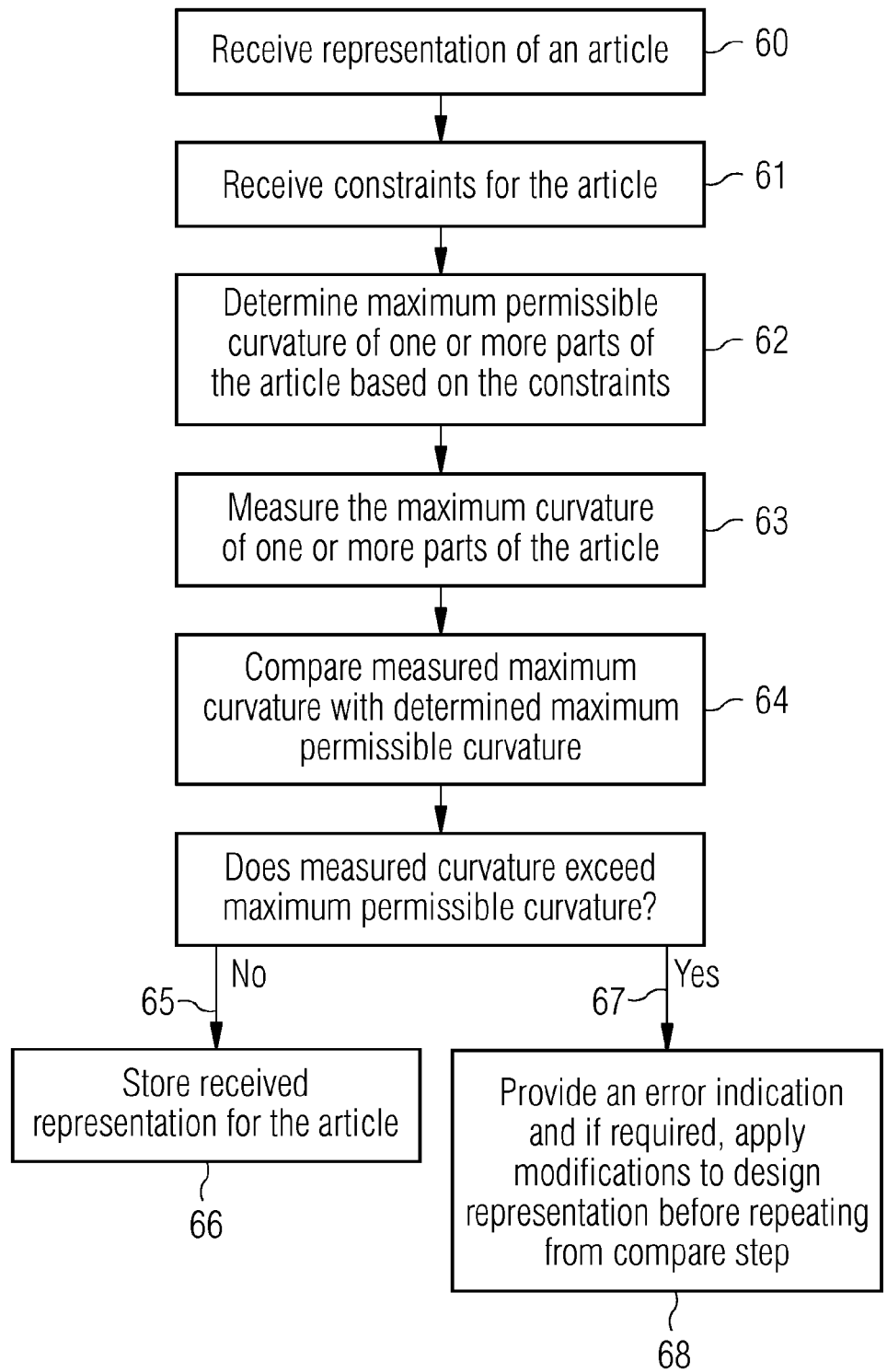

FIG. 10 is a flow diagram illustrating the main elements of the method of the present disclosure. A representation of an article to be manufactured, such as pipe work, metalwork, or cabling, or other length of material, is received 60 by the data processing system. Constraints for the article are received 61, which are associated with a parameter of the article, such as the material properties of the material from which the article is to be made. From the constraint information, a maximum permissible curvature of one or more parts of the article is determined 62. For example, certain materials will not be able to bend beyond a certain amount of curvature without cracking or breaking, or it may not be possible to form an article in that material if the curvature exceeds the determined maximum. The maximum curvature of one or more parts of the article as designed in the model is measured 63 and this measured maximum curvature is compared 64 with the determined maximum permissible curvature. If the measured curvature does not exceed 65 the determined maximum permissible curvature, then the received representation for the article is stored 66 and may be used subsequently in a manufacturing step. If the measured curvature exceeds 67 the determined maximum permissible curvature, then typically an error indication is provided 68. In response to this, modifications may be made to the design representation before repeating from compare step to adapt the design, so that it is more likely to comply with the constraints. When a design has been determined which does meet the constraints applicable for a particular product made in a particular material, then the representation of the article is stored. The representation may be converted into a set of manufacturing instructions for a computer controlled machine.

In an embodiment, the representation for those parts of the article which do not exceed the determined maximum permissible curvature may be stored a revised representation for the parts of the article which exceed the determined maximum permissible curvature is generated. The process may then be repeated from the comparing step and the revised representation stored for those parts of the article which meet the constraints until a complete representation meeting the constraints has been built up.

The representation of the article may be generated by simulating a system incorporating the article to be manufactured. The parameters of the article, from which the constraints are derived, typically comprise a physical property of a material from which a part of the article is to be manufactured. The constraints may be received from an external source, or extracted from a store.

A method of generating an article comprising a plurality of parts may comprise modelling the article in accordance with a method as described with respect to FIG. 10, inputting the stored representation, or dataset, for one or more parts of the article, or a set of manufacturing instructions derived from that dataset, to a computer controlled machine and replicating the parts of the article in the material for which it has been designed, or a material with equivalent properties, using the computer controlled machine.

The method is capable of returning an optimal solution for an important class of input interpolation points, those where the ideal path comprises lines and arcs. This is achieved by the choice of shape for the optimal spline. The method has the advantage of being very fast compared to other, more numerical, methods by using of numerical techniques in a single variable. The solution means that the curve shape is, apart from critical points, stable to small changes in the interpolation point positions. This is important for integration with other applications such as constraint solving using the D-Cubed Dimensional Constraint Managers (D-cubed DCM).

An operating system included in the data processing system enables an output from the system to be displayed to the user on display 6 and the user to interact with the system. Examples of operating systems that may be used in a data processing system may include Microsoft Windows™, Linux™, UNIX™, iOS™, and Android™ operating systems.

In addition, it should be appreciated that data processing system 1 may be implemented as in a networked environment, distributed system environment, virtual machines in a virtual machine architecture, and/or cloud environment. For example, the processor 2 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 1 may vary for particular implementations. For example the data processing system 1 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 1 may be connected to the network (not a part of data processing system 1), which can be any public or private data processing system network or combination of networks, as known to those of skill in the art, including the Internet. Data processing system 1 can communicate over the network with one or more other data processing systems such as a server (also not part of the data processing system 1). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

The invention claimed is:

1. A method of operating a computer aided design (CAD) system model for modelling an article to be manufactured, the method performed on a data processing system; the method comprising:
receiving a representation of the article in 2-dimensions, or in 3-dimensions;
receiving one or more constraints for the article associated with a parameter of the article;
determining a maximum permissible curvature of one or more parts of the article from the constraints of the article;
measuring a maximum curvature of the one or more parts of the article in the received representation;
comparing the measured maximum curvature with the maximum permissible curvature determined from the constraints of the article; and,
if the measured maximum curvature of at least one of the one or more parts exceeds the determined maximum permissible curvature, providing an error indication; or
if the measured maximum curvature of each of the one or more parts does not exceed the determined maximum permissible curvature, storing the received representation for the article.

2. The method according to claim 1, further comprising:
in response to the error indication, receiving modifications to the representation, or to the constraints; and, repeating from the comparing step, or from the determining step accordingly, until a compliant design is achieved, or a design is rejected.

3. The method according to claim 1, further comprising:
storing the representation for those parts of the article which do not exceed the determined maximum permissible curvature; and generating a revised representation for the parts of the article which exceed the determined maximum permissible curvature;
then repeating the method from the comparing step.

4. The method according to claim 3, further comprising:
generating the revised representation of the article by constructing an optimal curve representative of the article.

5. The method according to claim 4,
wherein the optimal curve comprises a spline.

6. The method according to claim 5,
wherein the spine comprises cubic Bézier segments.

7. The method according to claim 4,
wherein generating the revised representation comprises generating an intermediate curve from the optimal curve by interpolation.

8. The method according to claim 1,
wherein the representation of the article is generated by simulating a system incorporating the article to be manufactured.

9. The method according to claim 1,
wherein the parameters of the article comprise a physical property of a material from which a part of the article is to be manufactured.

10. The method according to claim 1,
wherein the constraints are received from an external source, or extracted from a store.

11. A method of generating an article; the method comprising:
modelling the article in accordance with claim 1, the article comprising a plurality of parts;
inputting the stored representation for one or more parts of the article to a computer controlled machine; and
replicating the parts of the article in a material, using the computer controlled machine.

12. The method according to claim 1, wherein the maximum permissible curvature is a maximum permissible radius of curvature and wherein the measured maximum curvature is a measured maximum radius of curvature.

13. The method according to claim 1,
wherein the parameters of the article comprise a physical property of a material from which a part of the article is to be manufactured; and wherein the maximum permissible curvature is selected such that the article of the material is configured to be formed based on the measured maximum curvature not exceeding the maximum permissible curvature.

14. The method according to claim 13, wherein the maximum permissible curvature is selected such that the material of the article is configured to crack or break if bent beyond the maximum permissible curvature.

15. The method according to claim 13, wherein the article is one of a pipe or a wire.

16. A data processing system, comprising:
a processor; and an accessible memory,
wherein the data processing system is configured to carry out the steps of:
receiving a representation of an article in 2-dimensions, or in 3-dimensions;
receiving one or more constraints for the article associated with a parameter of the article;
determining a maximum permissible curvature of one or more parts of the article from the constraints of the article;
measuring a maximum curvature of the one or more parts of the article in the received representation;
comparing the measured maximum curvature with the maximum permissible curvature determined from the constraints of the article; and,
if the measured maximum curvature of at least one of the one or more parts exceeds the determined maximum permissible curvature, providing an error indication; or,
if the measured maximum curvature of each of the one or more parts does not exceed the determined maximum permissible curvature, storing the received representation for the article.

17. A non-transitory computer-readable medium encoded with executable instructions that, when executed, cause one or more data processing systems to perform a method of modifying a computer aided design (CAD) system model, the method performed on a data processing system, the method comprising:
receiving a representation of an article in 2-dimensions, or in 3-dimensions;
receiving one or more constraints for the article associated with a parameter of the article;
determining a maximum permissible curvature of one or more parts of the article from the constraints of the article;
measuring a maximum curvature of the one or more parts of the article in the received representation;
comparing the measured maximum curvature with the maximum permissible curvature determined from the constraints of the article; and,
if the measured maximum curvature of at least one of the one or more parts exceeds the determined maximum permissible curvature, providing an error indication; or,
if the measured maximum curvature of each of the one or more parts does not exceed the determined maximum permissible curvature, storing the received representation for the article.

* * * * *